(12) United States Patent
Tzou et al.

(10) Patent No.: US 11,221,652 B2
(45) Date of Patent: Jan. 11, 2022

(54) ELECTRONIC DEVICE WITH MULTI SCREENS

(71) Applicants: Jyh-Chyang Tzou, Taipei (TW); Han-Tsai Liu, Taipei (TW); Pai-Feng Chen, Taipei (TW); Ying-Hua Chiang, Taipei (TW)

(72) Inventors: Jyh-Chyang Tzou, Taipei (TW); Han-Tsai Liu, Taipei (TW); Pai-Feng Chen, Taipei (TW); Ying-Hua Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/801,148

(22) Filed: Feb. 26, 2020

(65) Prior Publication Data

US 2020/0272201 A1     Aug. 27, 2020

Related U.S. Application Data

(60) Provisional application No. 62/810,915, filed on Feb. 26, 2019, provisional application No. 62/836,742, filed on Apr. 22, 2019.

(51) Int. Cl.
*G06F 1/16*     (2006.01)
(52) U.S. Cl.
CPC .......... *G06F 1/1647* (2013.01); *G06F 1/1624* (2013.01); *G06F 1/1681* (2013.01)
(58) Field of Classification Search
CPC .... G06F 1/1647; G06F 1/1624; G06F 1/1681; G06F 1/1654; G06F 1/1649; G06F 1/1677; G06F 1/1616
See application file for complete search history.

(56) References Cited

U.S. PATENT DOCUMENTS

| 7,864,514 B2 * | 1/2011 | Lee | F16M 11/10 361/679.21 |
| 9,167,711 B2 * | 10/2015 | Lee | G06F 1/1626 |

(Continued)

FOREIGN PATENT DOCUMENTS

| CN | 101533295 | 9/2009 |
| TW | I653524 | 3/2019 |

OTHER PUBLICATIONS

"Office Action of Taiwan Counterpart Application", dated Aug. 6, 2020, pp. 1-5.

(Continued)

*Primary Examiner* — Abhishek M Rathod
(74) *Attorney, Agent, or Firm* — JCIPRNET

(57) ABSTRACT

An electronic device with multi screens including a host, a hinge module, a first connecting base, a second connecting base, a first screen, and a second screen is provided. The hinge module is pivotally connected to the host and rotates along a first axial direction. The first connecting base is fixed on a first side of the hinge module. The second connecting base is pivotally connected to a second side of the hinge module and rotates along a second axial direction parallel to the first axial direction. The second connecting base is adjacent to the first connecting base. The first screen is slidably disposed in the first connecting base and the second connecting base. The second screen is detachably disposed in the second connecting base. The second connecting base is suitable for rotating relative to the hinge module to be aligned with or separated from the first connecting base.

22 Claims, 15 Drawing Sheets

(56) References Cited

U.S. PATENT DOCUMENTS

| | | | | |
|---|---|---|---|---|
| 2008/0062625 A1* | 3/2008 | Batio | .................... | G06F 1/1615 |
| | | | | 361/679.29 |
| 2009/0102744 A1 | 4/2009 | Ram | | |
| 2012/0162080 A1 | 6/2012 | Cao | | |
| 2015/0212546 A1* | 7/2015 | Ram | .................... | G06F 1/1649 |
| | | | | 361/679.01 |
| 2018/0129252 A1* | 5/2018 | Oakley | ................ | G06F 1/1616 |
| 2019/0004568 A1 | 1/2019 | Kaya et al. | | |

OTHER PUBLICATIONS

Office Action of China Counterpart Application, dated Jun. 25, 2021, pp. 1-6.

\* cited by examiner

ELECTRONIC DEVICE WITH MULTI SCREENS

CROSS-REFERENCE TO RELATED APPLICATION

This application claims the priority benefit of U.S. provisional application Ser. No. 62/810,915, filed on Feb. 26, 2019, and U.S. provisional application Ser. No. 62/836,742, filed on Apr. 22, 2019. The entirety of each of the above-mentioned patent applications is hereby incorporated by reference herein and made a part of this specification.

BACKGROUND OF THE INVENTION

1. Field of the Invention

The invention relates to an electronic device, and in particular, to an electronic device with multi screens whose screens may be used separately and in combination.

2. Description of Related Art

With the increase of the information processing amount, single-screen notebook computers can no longer meet requirements of users. There are two manners for an existing notebook computer to display a plurality of windows: One manner is to frequently switching windows, causing inconvenience in use, and causing low working efficiency, and the other manner is to zoom out a plurality of windows to be displayed on the screen at the same time. However, displaying a plurality of window at the same time causes display content to be extremely small, which is not easy to see clearly. Therefore, a notebook computer with a plurality of screens for displaying has been developed currently.

Existing multi-screen notebook computers are roughly classified into a built-in type and an add-on type. The built-in type is that a display end of the notebook computer has a plurality of screens, and has disadvantages of increasing the product thickness of the notebook computer and most cannot be used separately. The built-in type is mainly used for expanding the display area. The add-on type is that one side edge of the notebook computer is added with a screen, which easily causes a center-of-gravity shift of the notebook computer, and also deviates a visual angle of a user from the center. The add-on type does not conform to ergonomics.

SUMMARY OF THE INVENTION

The invention provides an electronic device with multi screens, including a first screen and a second screen that may be aligned with each other and separated from each other, so that when being aligned with each other, the first screen and the second screen help expand the display range, and when being separated from each other, the first screen and the second screen may be displayed in different directions to be not limited to be used by a single person.

An electronic device with multi screens of the invention includes a host, a hinge module, a first connecting base, a second connecting base, a first screen, and a second screen. The hinge module is pivotally connected to the host and rotates along a first axial direction. The first connecting base is fixed on one side of the hinge module. The second connecting base is pivotally connected to a second side of the hinge module and rotates along a second axial direction parallel to the first axial direction. The second connecting base is adjacent to the first connecting base. The first screen is slidably disposed in the first connecting base and the second connecting base. The second screen is detachably disposed in the second connecting base. The second connecting base is suitable for rotating relative to the hinge module to be aligned with or separated from the first connecting base. When the first connecting base and the second connecting base are aligned with each other, the first screen and the second screen are flush with each other, and when the first connecting base and the second connecting base are separated from each other, the first screen and the second screen includes an included angle therebetween.

An electronic device with multi screens of the invention includes a host, a hinge module, a first connecting base, a second connecting base, a first screen, and a second screen. The hinge module is pivotally connected to the host and rotates along a first axial direction. The first connecting base is fixed on one side of the hinge module. The second connecting base is pivotally connected to a second side of the hinge module and rotates along a second axial direction parallel to the first axial direction. The second connecting base is adjacent to the first connecting base. The first screen is slidably disposed in the first connecting base and the second connecting base. The second screen is detachably disposed in the second connecting base. The second connecting base is suitable for rotating relative to the hinge module to be aligned with the first connecting base, so that the first screen and the second screen are flush with each other, and the first display surface and the second display surface are located on a same plane.

An electronic device with multi screens of the invention includes a host, a hinge module, a connecting base, a first screen, and a second screen. The hinge module is pivotally connected to the host and rotates along a first axial direction. The connecting base is fixed on the hinge module. The first screen is slidably disposed in the connecting base and includes a first display surface. The second screen is detachably disposed in the connecting base and includes a second display surface. The first screen and the second screen are flush with each other, and the first display surface and the second display surface are located on a same plane.

Based on the above, the electronic device with multi screens of the invention includes the first screen and the second screen that may be aligned with each other and separated from each other, so that when being aligned with each other, the first screen and the second screen may be displayed in combination to increase the display range of a single visual angle, and when being separated from each other, the first screen and the second screen may be respectively displayed in different visual angles to be applicable to situations of discussions of a plurality of persons. Further, the first connecting base and the second connecting base are disposed on two sides of the hinge module, so that the first screen and the second screen are located at the center of the host. In this way, disadvantages of causing a center-of-gravity shift and deviating a visual angle from the center can be avoided. Therefore, the electronic device with multi screens of the invention more conforms to ergonomics.

DESCRIPTION OF THE EMBODIMENTS

Figure 1A:
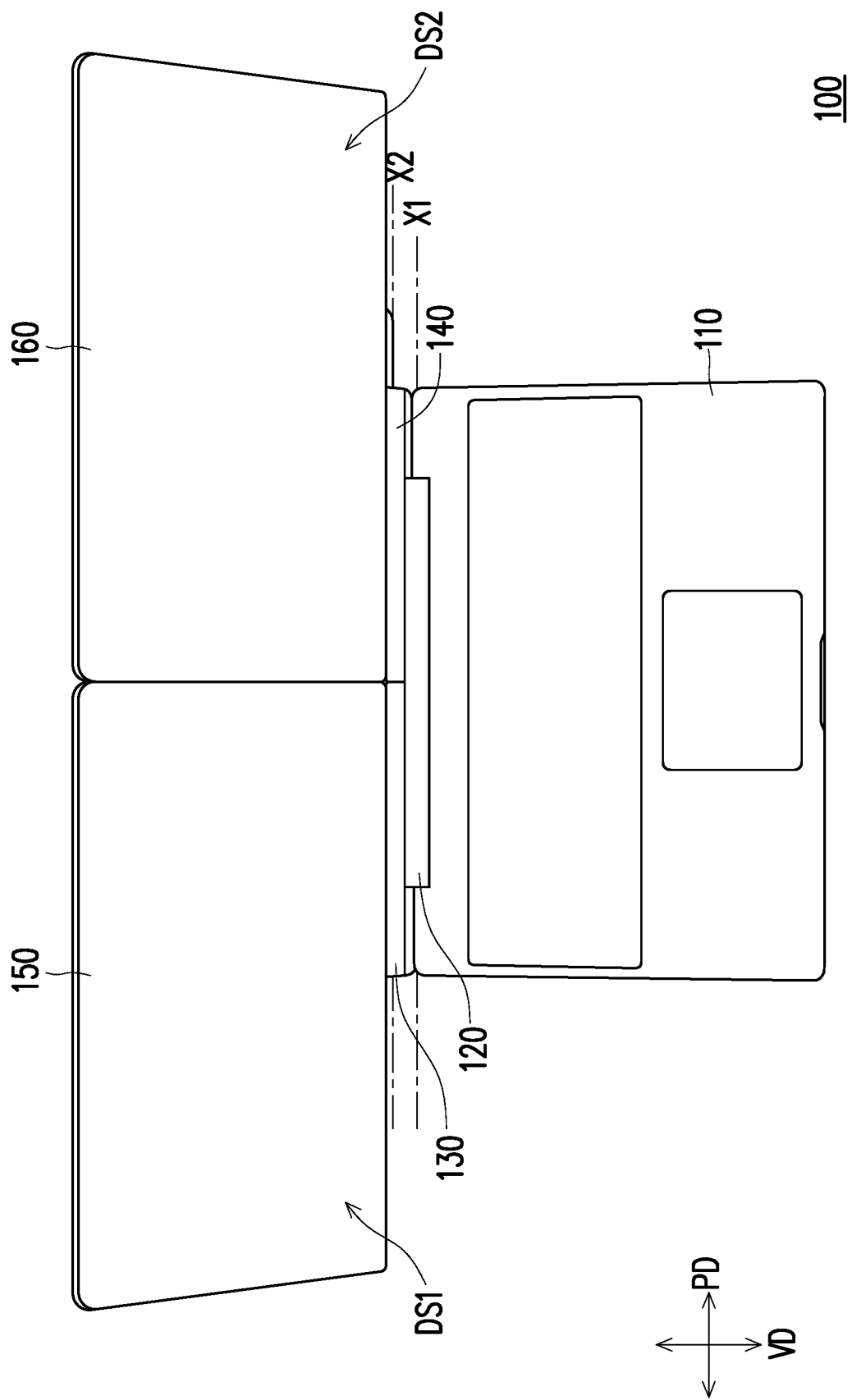
FIG. 1A is a schematic top view of a combination mode of an electronic device with multi screens according to an embodiment of the invention.
Figure 1B:
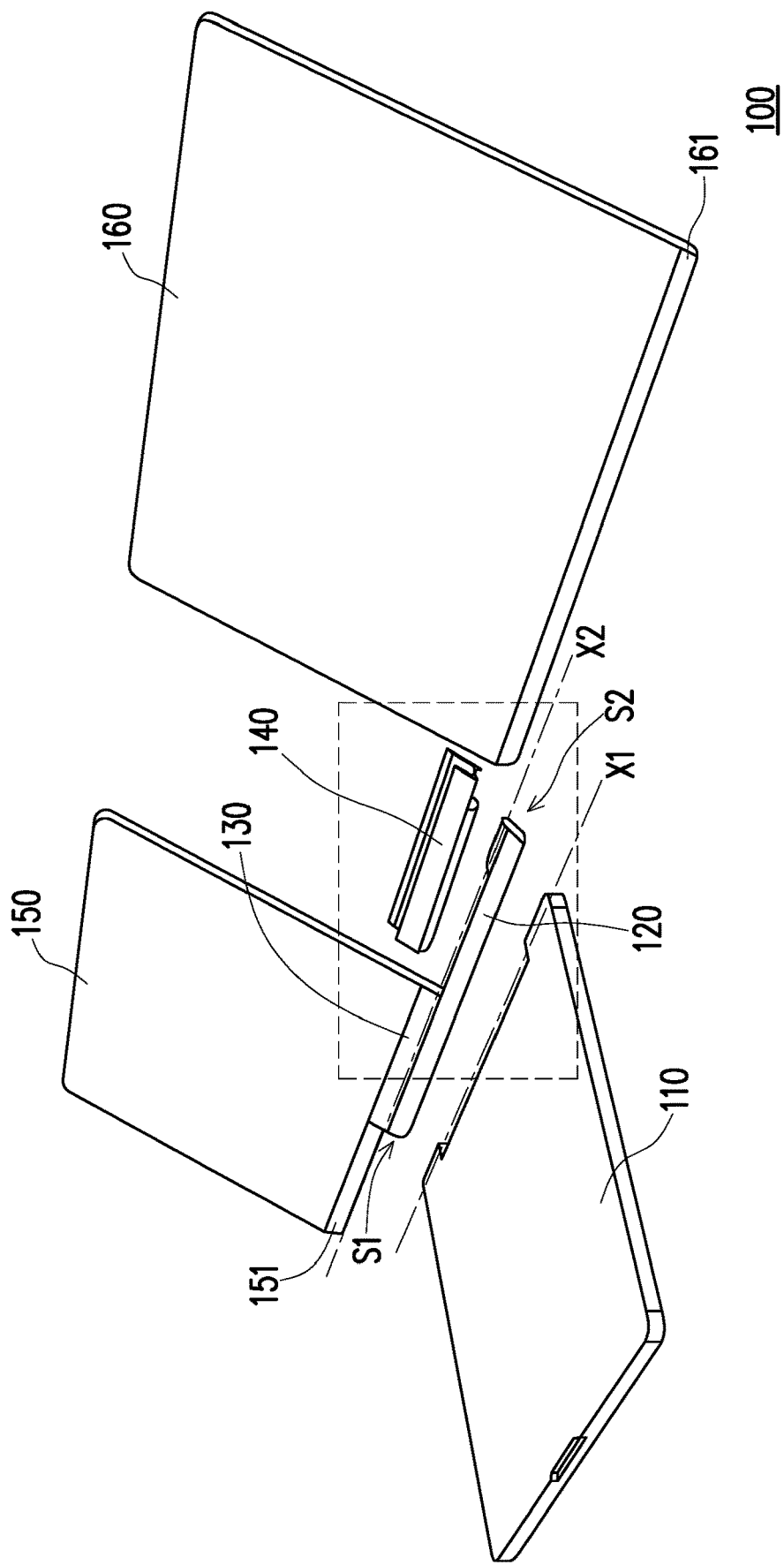
FIG. 1B is a schematic exploded view of components of the electronic device with multi screens in FIG. 1A.
Figure 1C:
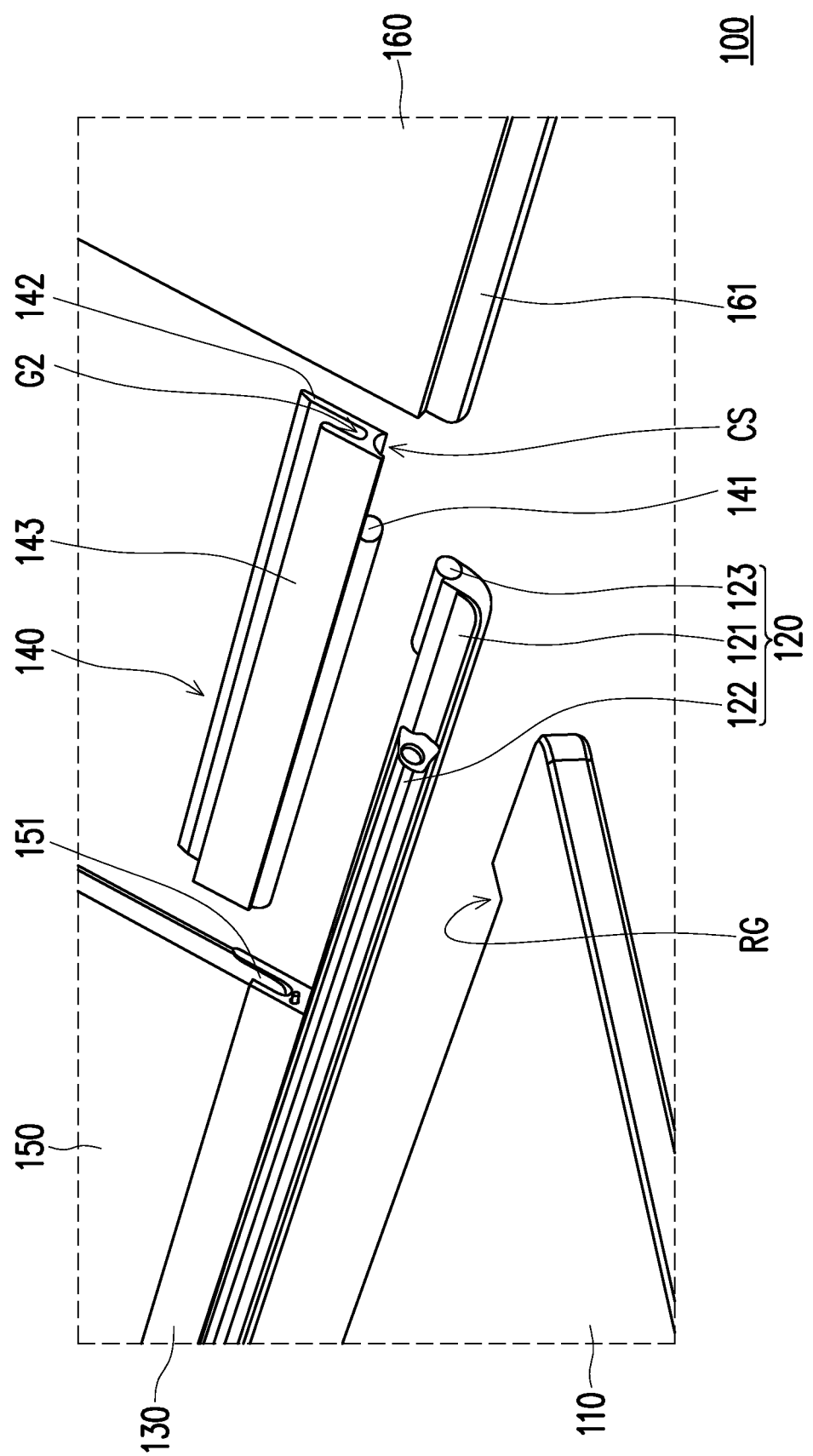
FIG. 1C is a schematic enlarged view of some components of the electronic device with multi screens in FIG. 1B.

FIG. 1A is a schematic top view of a combination mode of an electronic device with multi screens according to an embodiment of the invention. FIG. 1B is a schematic exploded diagram of components of the electronic device with multi screens in FIG. 1A. FIG. 1C is a schematic enlarged diagram of some components of the electronic device with multi screens in FIG. 1B.

Referring to FIG. 1A to FIG. 1C, the electronic device with multi screens 100 of the invention includes a host 110, a hinge module 120, a first connecting base 130, a second connecting base 140, a first screen 150, and a second screen 160.

The host 110 is configured to carry components such as a storage unit, a logical unit, a power supply unit, a transport unit, and an input unit. The hinge module 120 is pivotally connected to the host 110 and rotates along a first axial direction X1. The first connecting base 130 is fixed on one side 51 of the hinge module 120, namely, the first connecting base 130 and the hinge module 120 are of an integrally formed structure. The second connecting base 140 is pivotally connected to a second side S2 of the hinge module 120 and rotates along a second axial direction X2 parallel to the first axial direction X1. The second connecting base 140 is adjacent to the first connecting base 130.

Briefly, the first connecting base 130 and the second connecting base 140 may respectively rotate along the first axial direction X1 and the second axial direction X2, to achieve the effect of separating from each other.

The first screen 150 is slidably disposed in the first connecting base 130 and the second connecting base 140. Besides, the first screen 150 is suitable for sliding along a horizontal direction PD relative to the first connecting base 130, so that the first screen 150 may partially protrude beyond the first connecting base 130 or be aligned to be folded on the first connecting base 130 and the second connecting base 140. In addition, the first screen 150 is clamped at the first connecting base 130 by using a clamping structure (not shown in the figure). Therefore, the first screen 150 cannot be taken down from the first connecting base 130.

The second screen 160 is detachably disposed in the second connecting base 140. Further, the second screen 160 is slidably disposed in the second connecting base 140 to be adjacent to the first screen 150, and the first screen 150 and the second screen 160 are suitable for switching to a synchronous display mode or an individual display mode. When switching to the synchronous display mode, the first screen 150 and the second screen 160 display a same picture in combination, to expand the display range accordingly. When switching to the individual display mode, the first screen 150 and the second screen 160 respectively output different pictures, to achieve the effect of separated display accordingly.

Figure 2A:
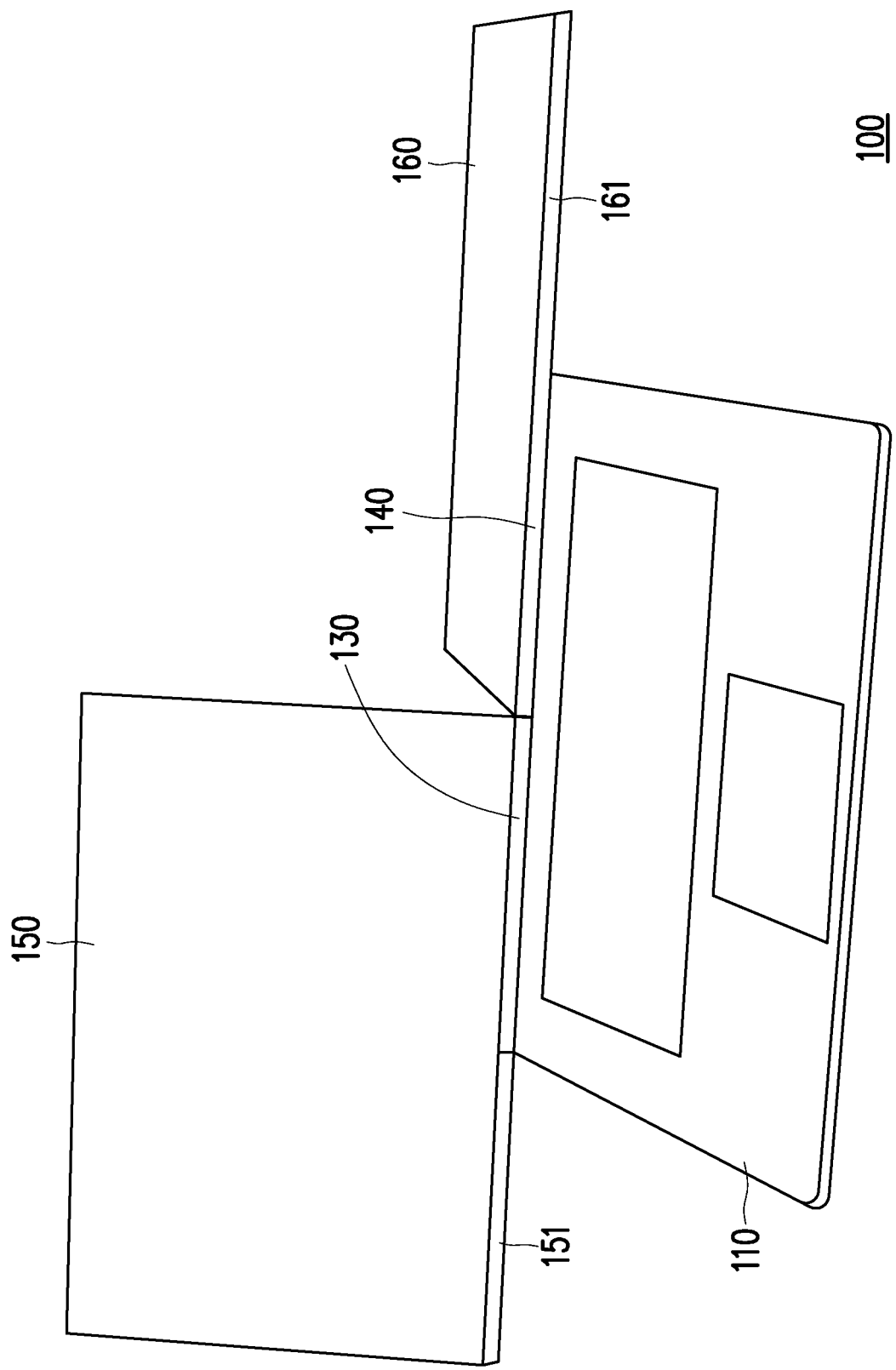
FIG. 2A is a schematic three-dimensional view of a separation mode of the electronic device with multi screens in FIG. 1A.
Figure 2B:
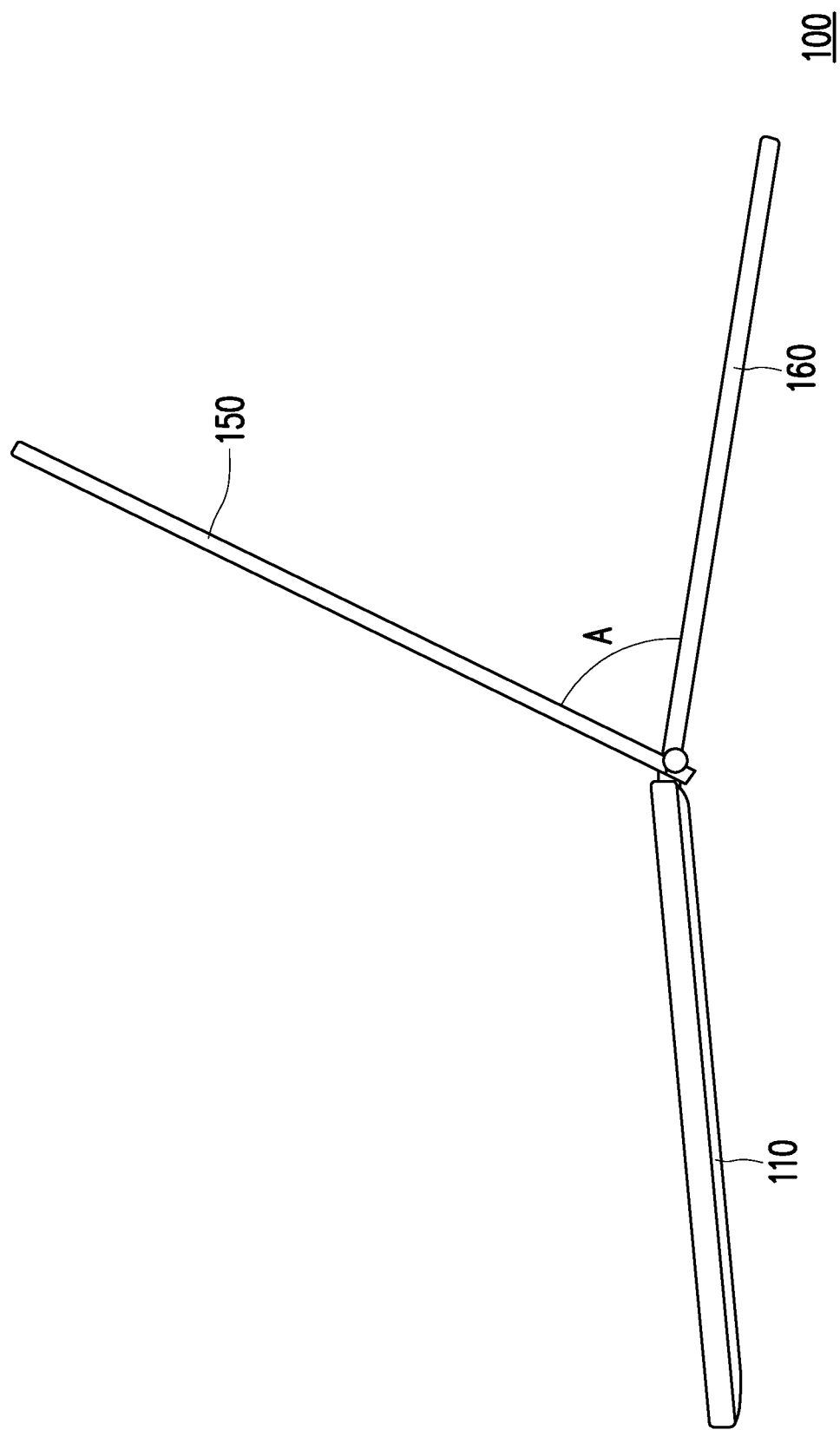
FIG. 2B is a schematic side view of the electronic device with multi screens in FIG. 2A.
Figure 2C:
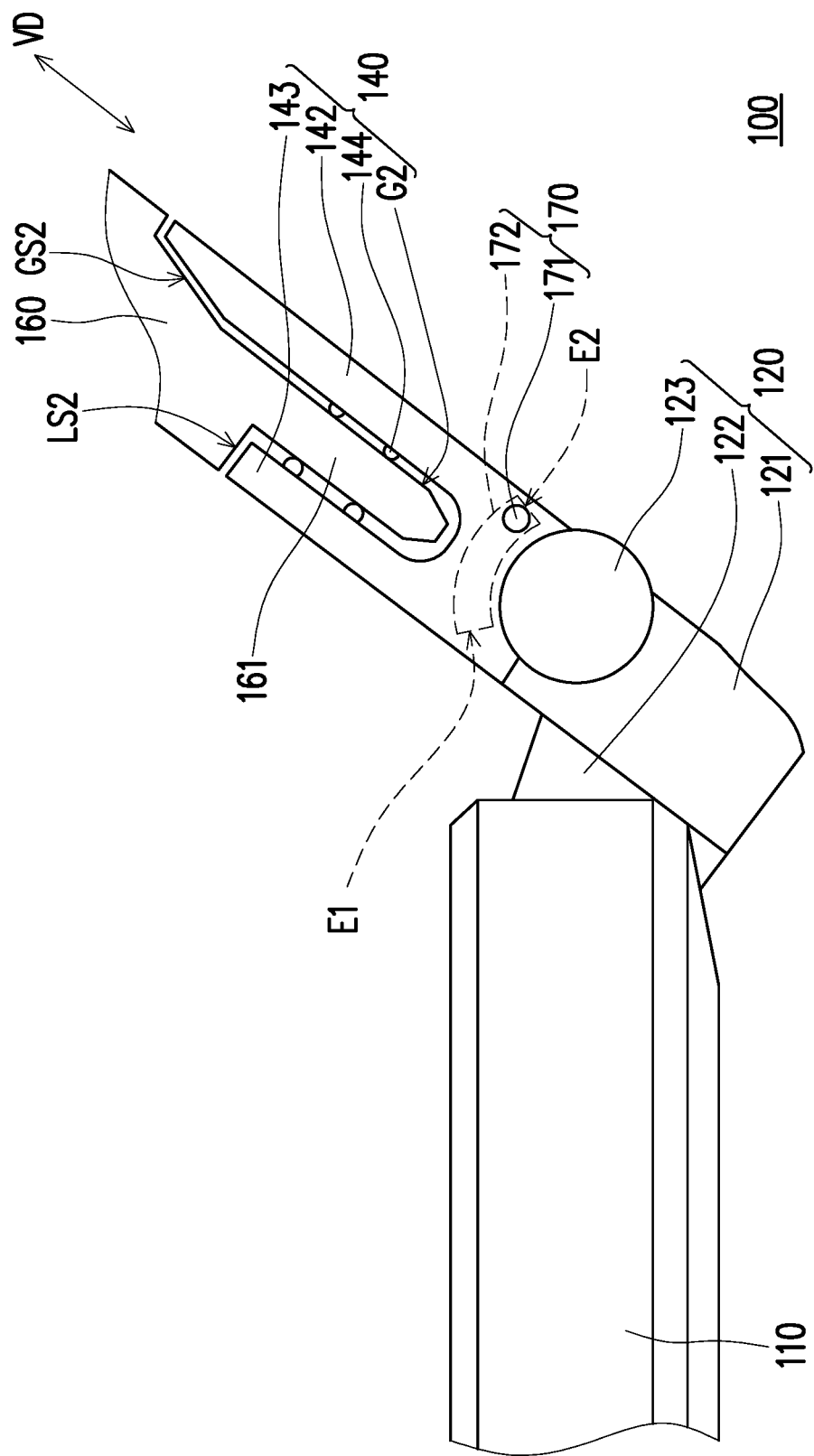
FIG. 2C is a schematic diagram of a rotating stroke of the electronic device with multi screens in FIG. 1A.
Figure 2D:
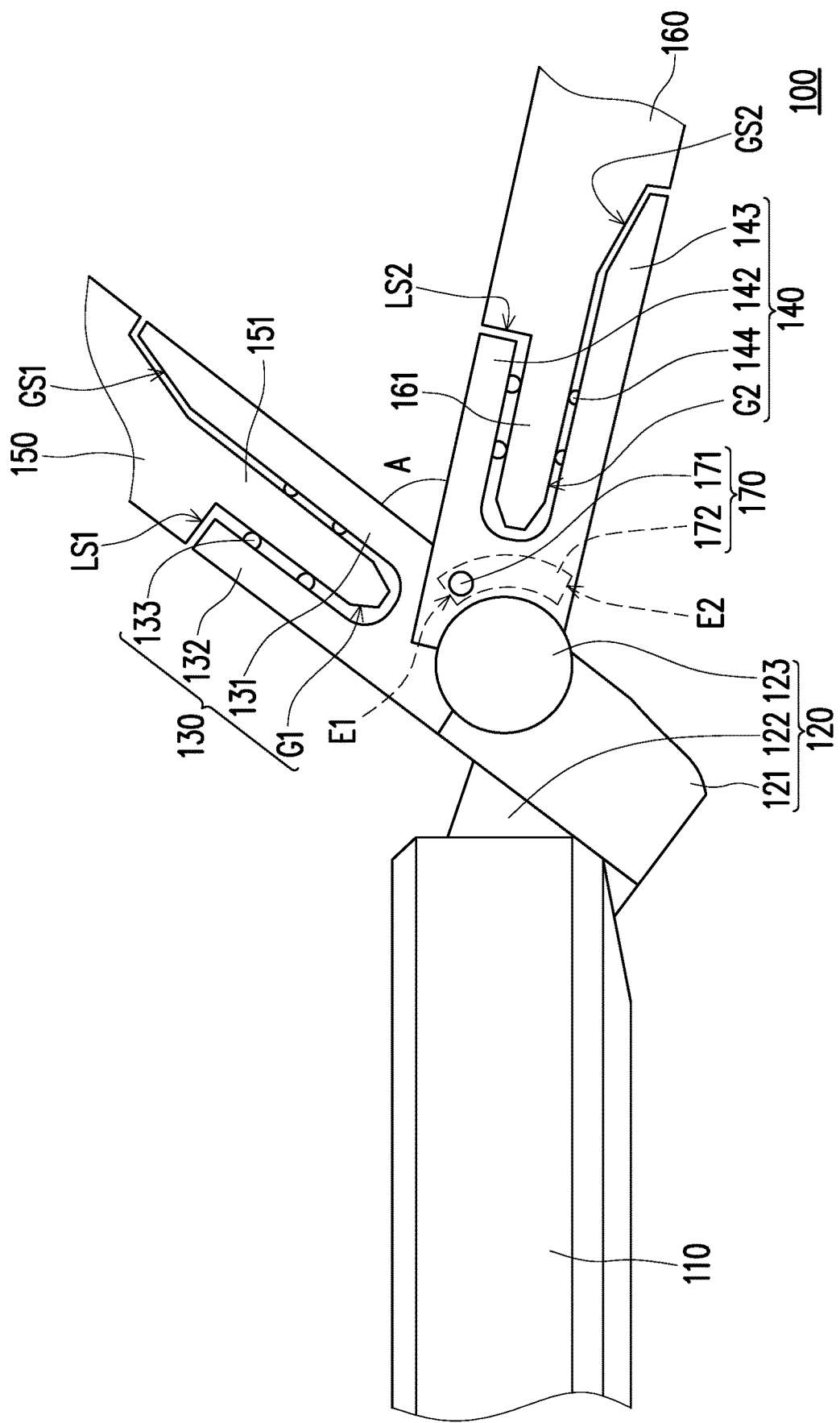
FIG. 2D is a schematic diagram of a rotating stroke of the electronic device with multi screens in FIG. 2A.
Figure 2E:
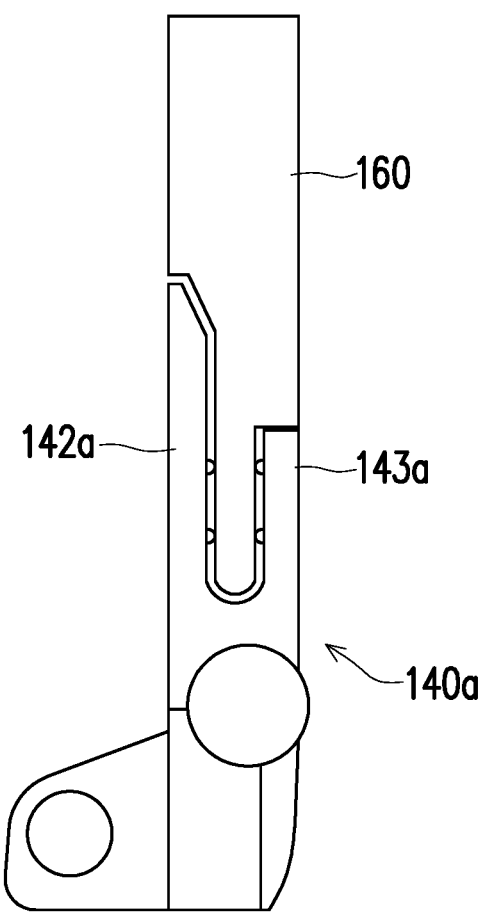
FIG. 2E is a schematic connection diagram of a second connecting base and a second screen according to another embodiment of the invention.

FIG. 2A is a schematic three-dimensional view of a separation mode of the electronic device with multi screens in FIG. 1A. FIG. 2B is a schematic side view of the electronic device with multi screens in FIG. 2A. FIG. 2C is a schematic diagram of a rotating stroke of the electronic device with multi screens in FIG. 1A. FIG. 2D is a schematic diagram of a rotating stroke of the electronic device with multi screens in FIG. 2A. FIG. 2E is a schematic connection diagram of a second connecting base and a second screen according to another embodiment of the invention.

Referring to FIG. 2A to FIG. 2D, the second connecting base 140 is suitable for rotating relative to the hinge module 120 along the second axial direction X2 to be aligned with or separated from the first connecting base 130. When the first connecting base 130 and the second connecting base 140 are aligned with each other, the first screen 150 and the second screen 160 are flush with each other and switch to the synchronous display mode. When the first connecting base 130 and the second connecting base 140 are separated from each other, the first screen 150 and the second screen 160 include an included angle A therebetween and switch to the individual display mode.

After the electronic device with multi screens 100 switches to the individual display mode, the first screen 150 and the second screen 160 may be respectively displayed in different directions, which is suitable for users in different directions to watch, and the second screen 160 may further provide use manners such as touch control and writing.

Referring to FIG. 1A to FIG. 1C, the hinge module 120 includes a support portion 121, a first rotating shaft portion 122, and a pivot portion 123. The first rotating shaft portion 122 is disposed on one side of the support portion 121 facing the host 110 and located in a rotating groove RG of the host 110, and the first rotating shaft portion 122 is rotatably connected to two rotating portions 111 of the host 110. The pivot portion 123 is disposed on the other side S2 of the support portion 121 and spaced from the first connecting base 130.

Referring to FIG. 2A to FIG. 2C, the second connecting base 140 includes a second rotating shaft portion 141 and a lower curved surface CS. The second rotating shaft portion 141 is pivotally connected to the pivot portion 123 of the hinge module 120 and the lower curved surface CS partially accommodates the pivot portion 123. When the second connecting base 140 rotates along the second axial direction X2, the lower curved surface CS is suitable for sliding on the pivot portion 123. Through the concave-convex matching of the lower curved surface CS and the pivot portion 123, the effect of guiding the second connecting base 140 to rotate can be achieved.

Referring to FIG. 1C, FIG. 2C, and FIG. 2D, the first connecting base 130 includes a first guide wall 131, a first limiting wall 132, a first groove G1, and a plurality of first protrusions 133. The first groove G1 is formed between the first guide wall 131 and the first limiting wall 132. The first screen 150 includes a first clamping portion 151, a first guide surface GS1, and a first limiting surface LS1. The first clamping portion 151 is clamped in the first groove G1, and the first guide surface GS1 and the first limiting surface LS1 respectively abut against the first guide wall 131 and the first limiting wall 132. A plurality of first protrusions 133 are respectively formed on the first guide wall 131 and the first limiting wall 132 and located in the first groove G1, and each first protrusion 133 interferes with and limits the first clamping portion 151 of the first screen 150, to avoid shaking of the first screen 150 in the first connecting base 130.

Specifically, an extended length L of the first guide wall 131 relative to the hinge module 120 is greater than an extended length L of the first limiting wall 132 relative to the hinge module 120. Referring to FIG. 2D, in the present embodiment, the first limiting wall 132 is formed on one side of the first connecting base 130 close to the host 110 and the first guide wall 131 is formed on one side of the first connecting base 130 away from the host 110. In other embodiments, the first limiting wall is, for example, formed on one side of the first connecting base away from the host and the first guide wall is formed on one side (not shown in the figure) of the first connecting base close to the host.

The second connecting base 140 includes a second guide wall 142, a second limiting wall 143, a second groove G2, and a plurality of second protrusions 144. The second groove G2 is formed between the second guide wall 142 and the second limiting wall 143. The second screen 160 includes a second clamping portion 161, a second guide surface GS2, and a second limiting surface LS2. The second clamping portion 161 is clamped in the second groove G2, and the second guide surface GS2 and the second limiting surface LS2 respectively abut against the second guide wall 142 and the second limiting wall 143. A plurality of the second protrusions 143 are respectively formed on the second guide wall 142 and the second limiting wall 143 and located in the second groove G2, and each second protrusion 143 interferes with and limits the second clamping portion 161 of the second screen 160, to prevent the second screen 160 from being separated from the second connecting base 140 in a vertical direction VD.

Specifically, an extended length L of the second guide wall 142 relative to the hinge module 120 is greater than an extended length L of the second limiting wall 143 relative to the hinge module 120. Referring to FIG. 2C, in the present embodiment, the second limiting wall 143 is formed on one side of the second connecting base 140 close to the host 110 and the second guide wall 142 is formed on one side of the second connecting base 140 away from the host 110, and a mounting direction of the second screen 160 is from the host 110 to the outside.

Referring to FIG. 2E, in another embodiment, the second limiting wall 143a is formed on one side of the second connecting base 140a away from the host 110a and the second guide wall 142a is formed on one side of the second connecting base 140a close to the host 110a, and a mounting direction of the second screen 160 is from the outside to the host 110a.

Referring to FIG. 2A to FIG. 2D, the electronic device with multi screens 100 includes a stroke guide structure 170, including a limiting column 171 and a fan-shaped guide groove 172, respectively disposed on a surface corresponding to the first connecting base 130 and the second connecting base 140. In the present embodiment, the limiting column 171 is formed on the first connecting base 130 and the fan-shaped guide groove 172 is formed on the second connecting base 140. The limiting column 171 slidably penetrates the fan-shaped guide groove 172. When the first connecting base 130 and the second connecting base 140 are aligned with each other, the limiting column 171 abuts against a second end E2 of the fan-shaped guide groove 172 close to the host 110. When the first connecting base 130 and the second connecting base 140 are separated from each other, the limiting column 171 is separated from the second end E2 of the fan-shaped guide groove 172 and slides toward a first end E1 of the fan-shaped guide groove 172, until the limiting column 171 abuts against the first end E1 (which is a maximum rotating angle of the second connecting base 140 relative to the first connecting base 130). Further, through the abutting of the fan-shaped guide groove 172 and the limiting column 171, the rotating angle of the second connecting base 140 relative to the first connecting base 130 is limited.

Figure 3A:
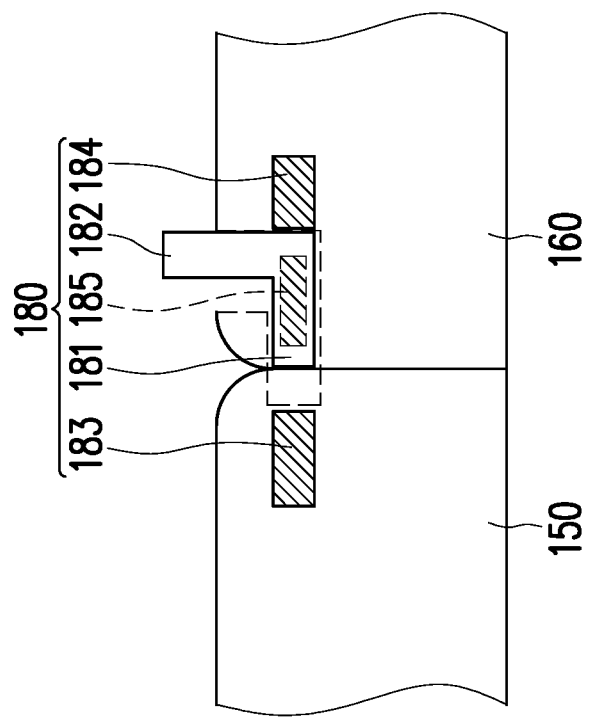
FIG. 3A is a schematic action diagram of a locking structure of the electronic device with multi screens in FIG. 2A locking a first screen and a second screen.
Figure 3B:
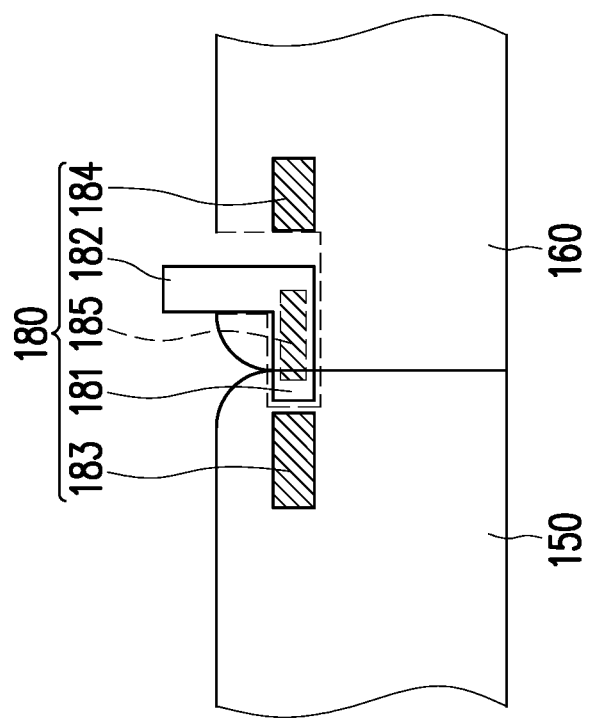
FIG. 3B is a schematic action diagram of the locking structure of the electronic device with multi screens in FIG. 3A being unlocked on the first screen and the second screen.

FIG. 3A is a schematic action diagram of a locking structure of the electronic device with multi screens in FIG. 2A locking a first screen and a second screen. FIG. 3B is a schematic action diagram of the locking structure of the electronic device with multi screens in FIG. 3A being unlocked on the first screen and the second screen.

Referring to FIG. 3A and FIG. 3B, the electronic device with multi screens 100 includes a locking structure 180, slidably disposed in the second screen 160. When the first screen 150 and the second screen 160 are flush with each other, the locking structure 180 is suitable for sliding toward the first screen 150 automatically or manually to lock the first screen 150 and the second screen 160. In this case, the first screen 150 and the second screen 160 are connected integrally, and no matter which screen (the first screen 150 or the second screen 160) a force is applied to, both the first screen 150 and the second screen 160 rotate synchronously relative to the host 110.

Further, the locking structure 180 includes a locking block 181, a toggle block 182, a first magnet 183, a second magnet 184, and a third magnet 185. The locking block 181 is slidably disposed in the second screen 160 and is suitable for penetrating the first screen 150. The toggle block 182 is vertically disposed on one end of the locking block 181 away from the first screen 150 and extends upward beyond the second screen 160, and the toggle block 182 is configured to be manually adjusted by a user. The first magnet 183, the second magnet 184, and third magnet 185 are respectively disposed on the first screen 150, the second screen 160, and the locking block 181.

Referring to FIG. 3A, when the first magnet 183 and the third magnet 185 are attracted to each other, the locking block 181 is driven to penetrate the first screen 150, so that the first screen 150 and the second screen 160 lock each other. Referring to FIG. 3B, when the second magnet 184 and the third magnet 185 are attracted to each other, the locking block 181 is driven away from the first screen 150, so that the first screen 150 and the second screen 160 do not lock each other.

In other embodiments, the locking structure is, for example, disposed in the hinge module and suitable for locking the second connecting base, so that the second connecting base cannot rotate relative to the first connecting base, to achieve the objective of locking the first screen and the second screen.

Figure 3C:
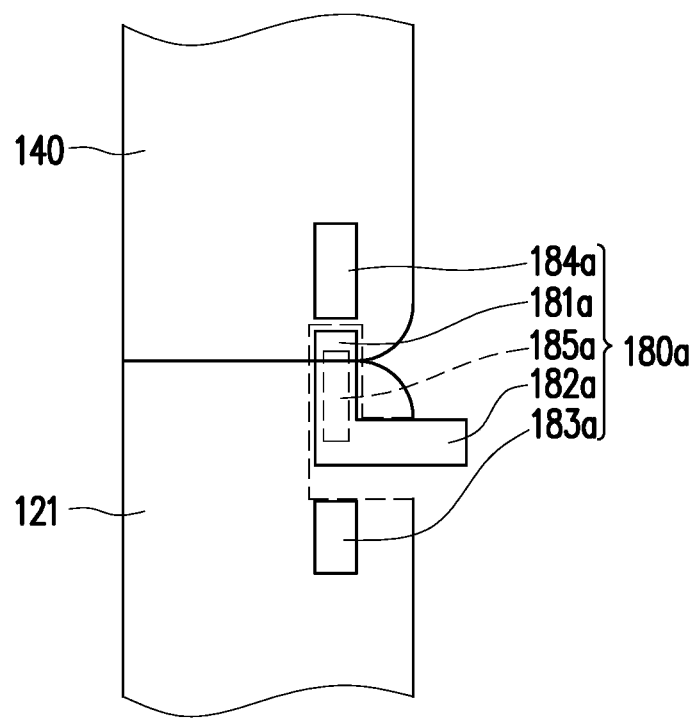
FIG. 3C is a schematic action diagram of the locking structure of the electronic device with multi screens in FIG. 2A locking a hinge module and a second connecting base.
Figure 3D:
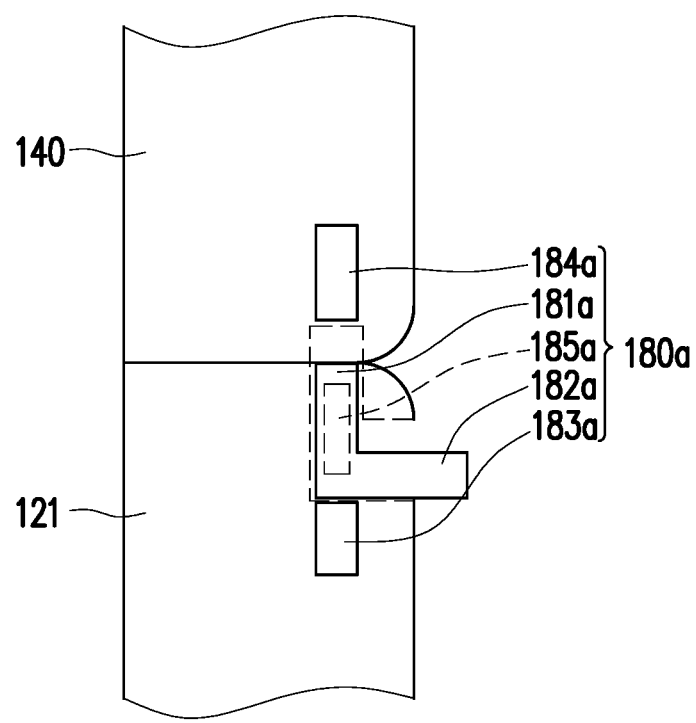
FIG. 3D is a schematic action diagram of the locking structure of the electronic device with multi screens in FIG. 3C being unlocked on the hinge module and the second connecting base.

FIG. 3C is a schematic action diagram of the locking structure of the electronic device with multi screens in FIG. 2A locking a hinge module and a second connecting base. FIG. 3D is a schematic action diagram of the locking structure of the electronic device with multi screens in FIG. 3C being unlocked on the hinge module and the second connecting base.

Referring to FIG. 3C and FIG. 3D, the electronic device with multi screens 100 includes a locking structure 180a, slidably disposed in the support portion 121 of the hinge module 120. When the first connecting base 130 and the second connecting base 140 are aligned with each other, the locking structure 180a is suitable for sliding toward the second connecting base 140 automatically or manually to lock the support portion 121 and the second connecting base 140. In this case, the first connecting base 130 and the second connecting base 140 are connected integrally, and no matter which screen (the first screen 150 or the second screen 160) a force is applied to, both the first screen 150 and the second screen 160 synchronously drive the first connecting base 130 and the second connecting base 140 to rotate relative to the host 110.

The locking structure 180a includes a locking block 181a, a toggle block 182a, a first magnet 183a, a second magnet 184a, and a third magnet 185a. The locking block 181a is slidably disposed in the support portion 121 and is suitable for penetrating the second connecting base 140a. The toggle block 182a is vertically disposed on one end of the locking block 181a away from the second connecting base 140 and extends beyond the support portion 121, and the toggle block 182a is configured to be manually adjusted by a user. The first magnet 183a, the second magnet 184a, and third magnet 185a are respectively disposed on the support portion 121, the second connecting base 140, and the locking block 181a.

Referring to FIG. 3D, when the first magnet 183a and the third magnet 185a are attracted to each other, the locking block 181a is driven to penetrate the second connecting base 140, so that the support portion 121 and the second connecting base 140 lock each other. Referring to FIG. 3C, when the second magnet 184a and the third magnet 185a are attracted to each other, the locking block 181a is driven away from the second connecting base 140, so that the support portion 121 and the second connecting base 140 do not lock each other.

Figure 3E:
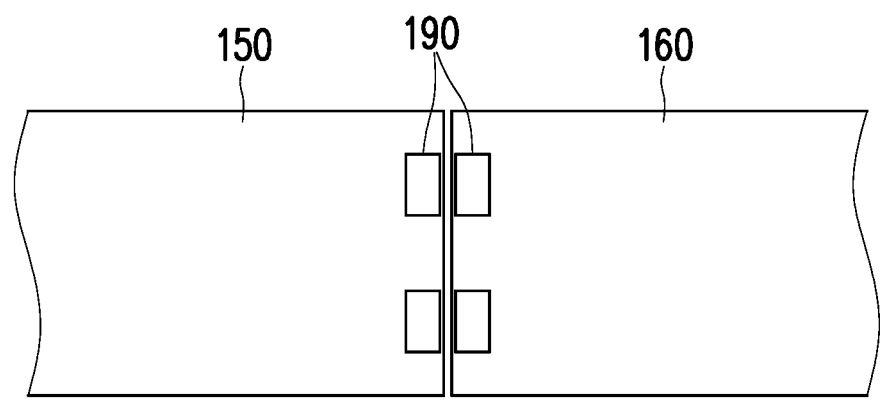
FIG. 3E is a schematic planar diagram of the electronic device with multi screens in FIG. 1A adopting a plurality of positioning magnets.

FIG. 3E is a schematic planar diagram of the electronic device with multi screens in FIG. 1A adopting a plurality of positioning magnets.

Referring to FIG. 1A and FIG. 3E, when the first screen 150 and the second screen 160 switch to the synchronous display mode, the second connecting base 140 is suitable for rotating relative to the hinge module 120 to be aligned with the first connecting base 130, so that the first screen 150 and the second screen 160 are flush with each other, and a first display surface DS1 of the first screen 150 and a second display surface DS2 of the second screen 160 are located on a same plane. The electronic device with multi screens 100 further includes a plurality of positioning magnets 190, respectively disposed on two opposite sides of the first screen 150 and the second screen 160, and the plurality of corresponding positioning magnets 190 are attracted to each other magnetically, so that the first screen 150 and the second screen 160 may be connected stably, to prevent the first display surface DS1 and the second display surface DS2 from generating a height difference due to external factors.

Figure 1D:
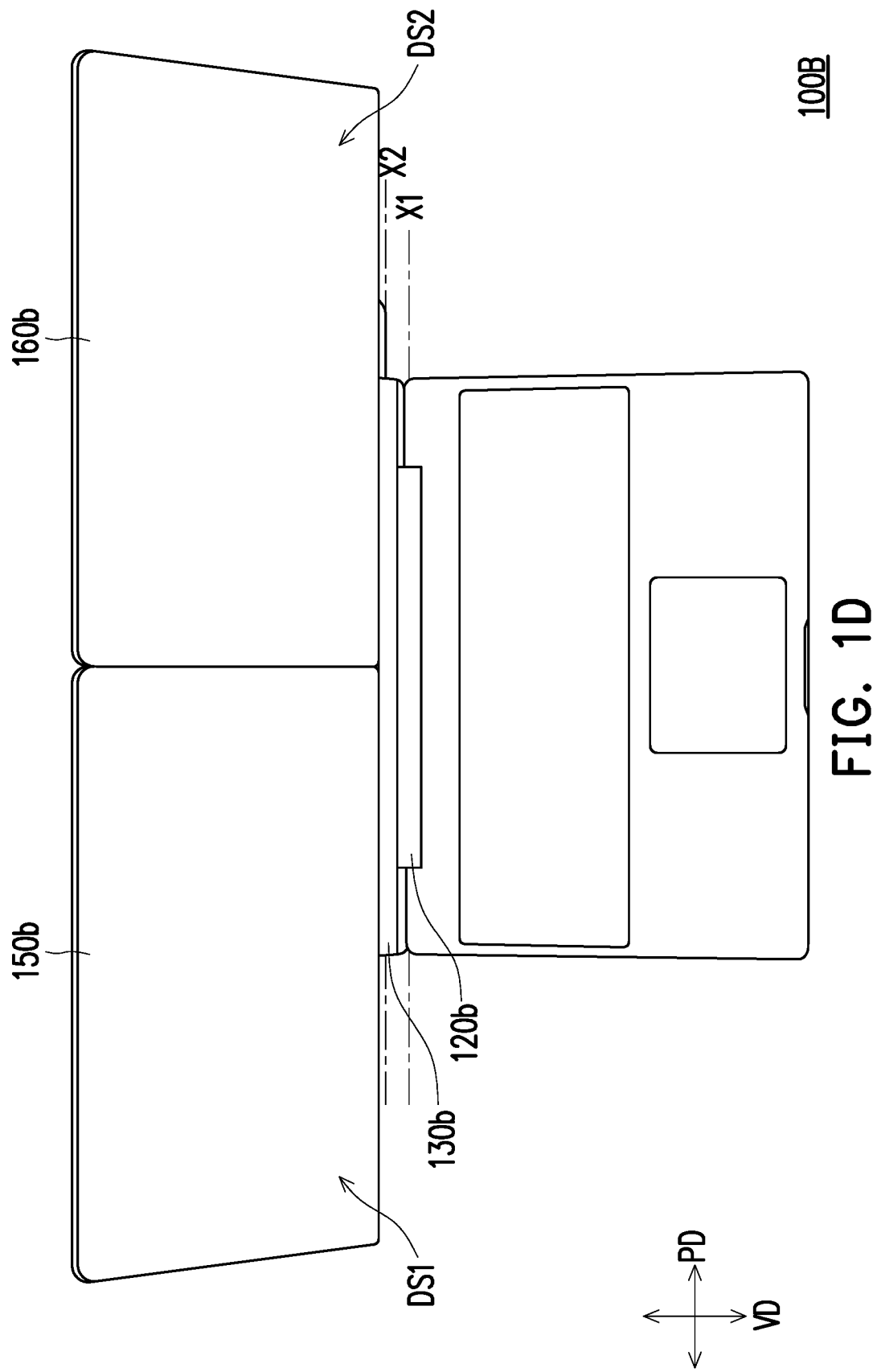
FIG. 1D is a schematic top view of a combination mode of an electronic device with multi screens according to another embodiment of the invention.

FIG. 1D is a schematic top view of a combination mode of an electronic device with multi screens according to another embodiment of the invention. Referring to FIG. 1D, a difference of the electronic device with multi screens 100B in the present embodiment from the electronic device with multi screens 100 in FIG. 1A lies in: The electronic device with multi screens 100B includes an integrally formed connecting base 130b, fixed on a hinge module 120b. A first screen 150b is slidably disposed in the connecting base 130b and includes a first display surface DS1. A second screen 160b is detachably disposed in the connecting base 130b and includes a second display surface DS2. The first screen 150b and the second screen 160b are flush with each other, and the first display surface DS1 and the second display surface DS2 are located on a same plane.

Figure 4A:
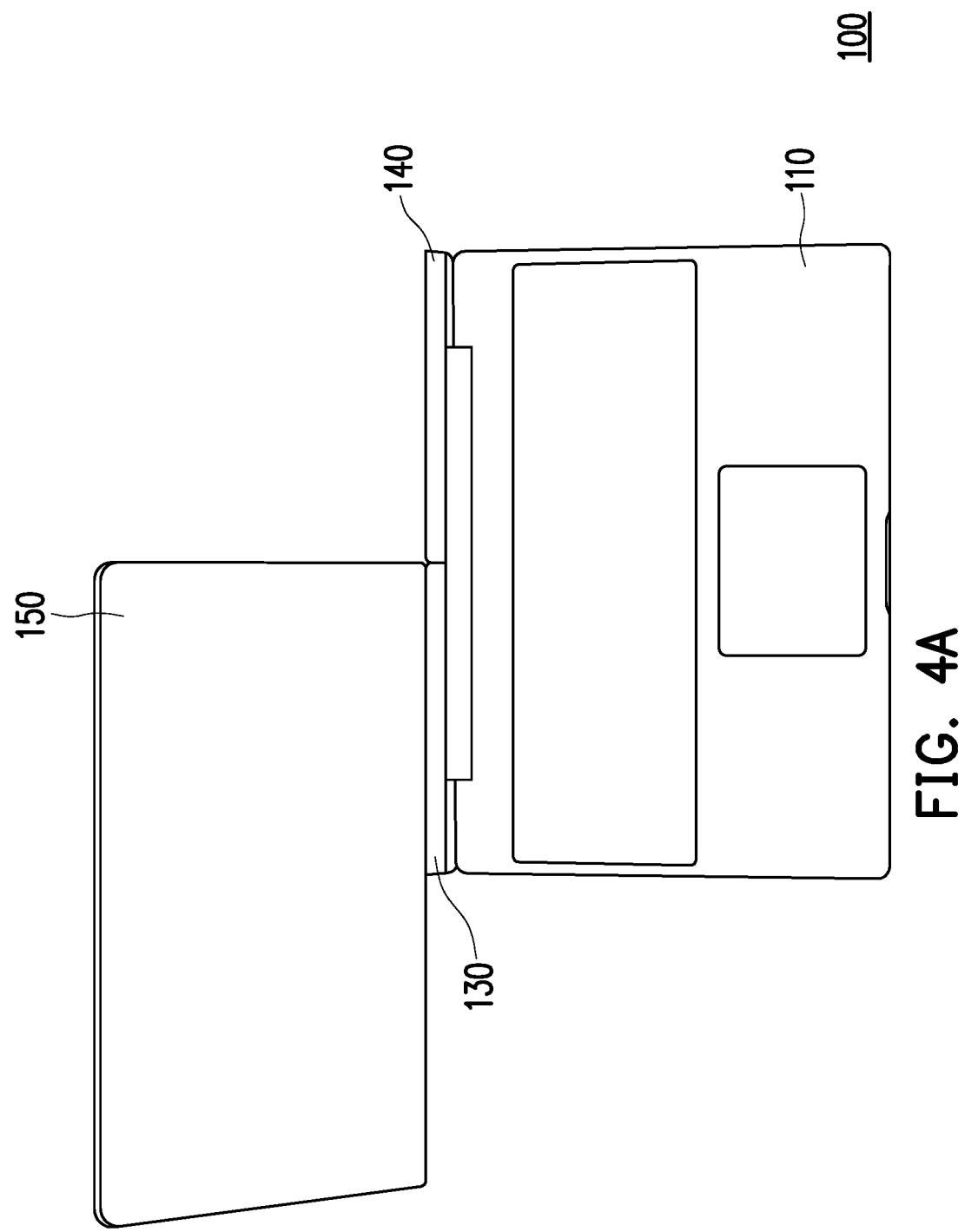
FIG. 4A is a schematic top view of the electronic device with multi screens in FIG. 1A discounting the second screen.
Figure 4B:
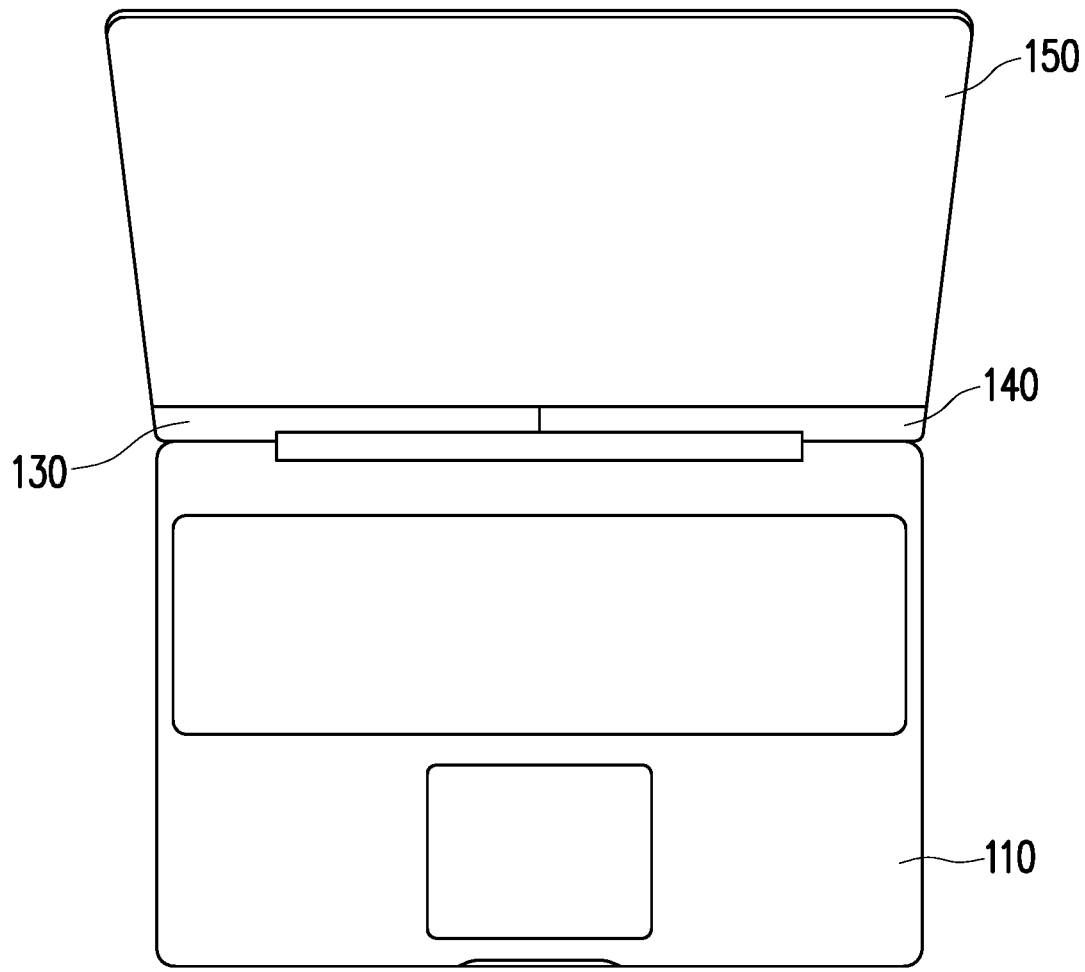
FIG. 4B is a schematic top view of a first screen of the electronic device with multi screens in FIG. 1A being clamped between a first connecting base and a second connecting base.
Figure 4C:
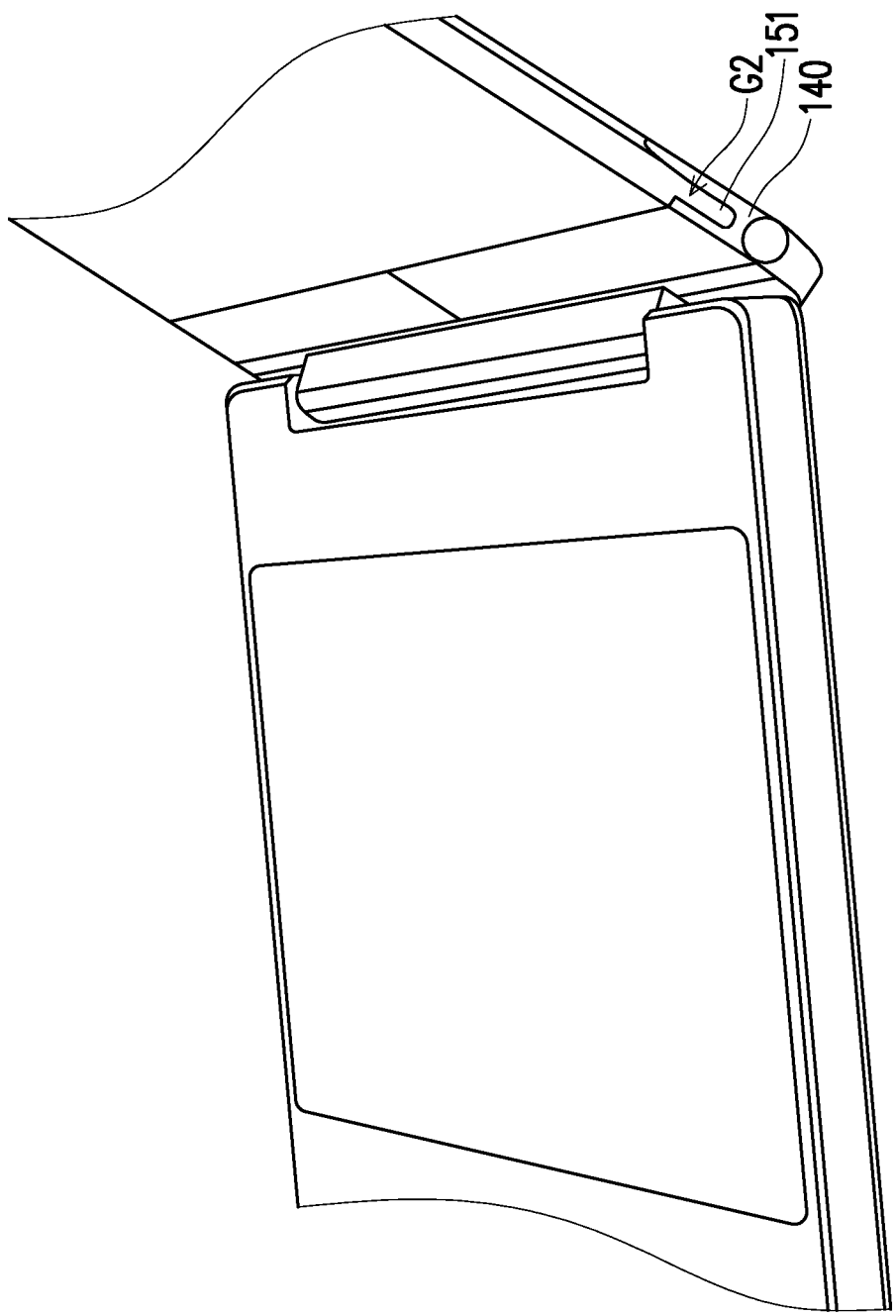
FIG. 4C is a partial schematic enlarged three-dimensional view of the electronic device with multi screens in FIG. 4B.

FIG. 4A is a schematic top view of the electronic device with multi screens in FIG. 1A discounting the second screen. FIG. 4B is a schematic top view of a first screen of the electronic device with multi screens in FIG. 1A being clamped between a first connecting base and a second connecting base. FIG. 4C is a partial schematic enlarged three-dimensional view of the electronic device with multi screens in FIG. 4B.

Referring to FIG. 1C, and FIG. 4A to FIG. 4C, the following describes the process of the electronic device with multi screens 100 in the present embodiment switching to a single screen. When the second clamping portion 161 of the second screen 160 is separated from the second groove G2 of the second connecting base 140, the first clamping portion 151 of the first screen 150 is suitable for sliding relative to the first connecting base 130 to be clamped in the first groove G1 of the first connecting base 130 and the second groove G2 of the second connecting base 140, so that two sides of the first screen 150 are aligned with two sides of the host 110. In this case, the electronic device with multi screens 100 is the same as a general single-screen notebook computer, and is easy to carry.

Besides, when the second screen 160 is separated from the second connecting base 140, an expansion member (not shown in the figure) is suitable for being connected to the second clamping portion 161 (the second clamping portion 161 is provided with a wireless transmission module, a power supply port, or an audio signal port) of the second screen 160. Therefore, the expansion member includes a battery, a loudspeaker, or a support frame. Accordingly, the second screen 160 is converted into a tablet computer used independently.

Based on the above, the electronic device with multi screens of the invention includes the first screen and the second screen that may be aligned with each other and separated from each other, so that when being aligned with each other, the first screen and the second screen may be displayed in combination to increase the display range of a single visual angle, and when being separated from each other, the first screen and the second screen may be respectively displayed in different visual angles to be applicable to situations of discussions of a plurality of persons. Further, the first connecting base and the second connecting base are disposed on two sides of the hinge module, so that the first screen and the second screen are located at the center of the host. In this way, disadvantages of causing a center-of-gravity shift and deviating a visual angle from the center can be avoided. Therefore, the electronic device with multi screens of the invention more conforms to ergonomics.

What is claimed is:

1. An electronic device with multi screens, comprising:
   a host;
   a hinge module, pivotally connected to the host and rotating along a first axial direction;
   a first connecting base, fixed on a first side of the hinge module;
   a second connecting base, pivotally connected to a second side of the hinge module and rotating along a second axial direction parallel to the first axial direction, wherein the second connecting base is adjacent to the first connecting base;
   a first screen, slidably disposed in the first connecting base and the second connecting base; and
   a second screen, detachably disposed in the second connecting base, wherein
   the second connecting base is suitable for rotating relative to the hinge module to be aligned with or separated from the first connecting base, when the first connecting base and the second connecting base are aligned with each other, the first screen and the second screen are flush with each other, and when the first connecting base and the second connecting base are separated from each other, the first screen and the second screen have an included angle therebetween.

2. The electronic device with multi screens according to claim 1, wherein the hinge module has a support portion, a first rotating shaft portion, and a pivot portion, the first rotating shaft portion is disposed on one side of the support portion facing the host and is located in a rotating groove of the host, and the pivot portion is disposed on the support portion and is spaced from the first connecting base.

3. The electronic device with multi screens according to claim 2, wherein the two connecting bases have a second rotating shaft portion and a lower curved surface, the second rotating shaft portion is pivotally connected to the pivot portion, and the lower curved surface partially accommodates the pivot portion.

4. The electronic device with multi screens according to claim 1, wherein the first connecting base has a first guide wall, a first limiting wall, and a first groove, the first groove is formed between the first guide wall and the first limiting wall, the first screen has a first clamping portion, a first guide surface, and a first limiting surface, the first clamping portion is clamped in the first groove, and the first guide surface and the first limiting surface respectively abut against the first guide wall and the first limiting wall.

5. The electronic device with multi screens according to claim 4, wherein an extended length of the first guide wall relative to the hinge module is greater than an extended length of the first limiting wall relative to the hinge module.

6. The electronic device with multi screens according to claim 4, wherein the first connecting base has a plurality of first protrusions, respectively formed on the first guide wall and the first limiting wall and located in the first groove, and each of the first protrusions interferes with and limits the first clamping portion.

7. The electronic device with multi screens according to claim 4, wherein the first limiting wall is formed on one side of the first connecting base close to the host and the first guide wall is formed on one side of the first connecting base away from the host, or the first limiting wall is formed on one side of the first connecting base away from the host and the first guide wall is formed on one side of the first connecting base close to the host.

8. The electronic device with multi screens according to claim 1, wherein the second connecting base has a second guide wall, a second limiting wall, and a second groove, the second groove is formed between the second guide wall and the second limiting wall, the second screen has a second clamping portion, a second guide surface, and a second limiting surface, the second clamping portion is clamped in the second groove, and the second guide surface and the second limiting surface respectively abut against the second guide wall and the second limiting wall.

9. The electronic device with multi screens according to claim 8, wherein an extended length of the second guide wall relative to the hinge module is greater than an extended length of the second limiting wall relative to the hinge module.

10. The electronic device with multi screens according to claim 8, wherein the second connecting base has a plurality of second protrusions, respectively formed on the second guide wall and the second limiting wall and located in the second groove, and each of the second protrusions interferes with and limits the second clamping portion.

11. The electronic device with multi screens according to claim 8, wherein the second limiting wall is formed on one side of the second connecting base close to the host and the second guide wall is formed on one side of the second connecting base away from the host, or the second limiting wall is formed on one side of the first connecting base away from the host and the second guide wall is formed on one side of the second connecting base close to the host.

12. The electronic device with multi screens according to claim 1, further comprising a locking structure, slidably disposed in the second screen, wherein when the first screen and the second screen are flush with each other, the locking structure is suitable for sliding toward the first screen to lock the first screen and the second screen.

13. The electronic device with multi screens according to claim 12, wherein the locking structure has a locking block and a toggle block, the locking block is suitable for penetrating the first screen, and the toggle block is vertically disposed on one end of the locking block away from the first screen and extends upward beyond the second screen.

14. The electronic device with multi screens according to claim 13, wherein the locking structure has a first magnet, a second magnet, and a third magnet, respectively disposed on the first screen, the second screen, and the locking block, when the first magnet and the third magnet are attracted to each other, the locking block is driven to penetrate the first screen, so that the first screen and the second screen lock each other, and when the second magnet and the third magnet are attracted to each other, the locking block is driven away from the first screen, so that the first screen and the second screen do not lock each other.

15. The electronic device with multi screens according to claim 2, further comprising a locking structure, slidably disposed in the support portion, wherein when the first connecting base and the second connecting base are aligned with each other, the locking structure is suitable for sliding toward the second connecting base to lock the support portion of the hinge module and the second connecting base.

16. The electronic device with multi screens according to claim 15, wherein the locking structure has a locking block and a toggle block, the locking block is suitable for penetrating the second connecting base, and the toggle block is vertically disposed on one end of the locking block away from the second connecting base and extends beyond the support portion.

17. The electronic device with multi screens according to claim 16, wherein the locking structure comprises a first magnet, a second magnet, and a third magnet, respectively disposed on the support portion, the second connecting base, and the locking block, when the first magnet and the third magnet are attracted to each other, the locking block is driven to penetrate the second connecting base, so that the support portion and the second connecting base lock each other, and when the second magnet and the third magnet are attracted to each other, the locking block is driven away from the second connecting base, so that the support portion and the second connecting base do not lock each other.

18. The electronic device with multi screens according to claim 1, further comprising a stroke guide structure, having a limiting column and a fan-shaped guide groove, respectively disposed on a surface corresponding to the first connecting base and the second connecting base, wherein the limiting column slidably penetrates the fan-shaped guide groove, when the first connecting base and the second connecting base are aligned with each other, the limiting column abuts against a second end of the fan-shaped guide groove, and when the first connecting base and the second connecting base are separated from each other, the limiting column slides toward a first end of the fan-shaped guide groove.

19. The electronic device with multi screens according to claim 1, wherein when the second screen is separated from the second connecting base, the first screen is suitable for sliding relative to the first connecting base to be clamped in the first connecting base and the second connecting base, so that two sides of the first screen are aligned with two sides of the host.

20. The electronic device with multi screens according to claim 1, wherein when the second screen is separated from the second connecting base, an expansion member is suitable for being connected to the second screen, and the expansion member comprises a battery, a loudspeaker, or a support frame.

21. An electronic device with multi screens, comprising:
a host;
a hinge module, pivotally connected to the host and rotating along a first axial direction;
a first connecting base, fixed on a first side of the hinge module;
a second connecting base, pivotally connected to a second side of the hinge module and rotating along a second axial direction parallel to the first axial direction, wherein the second connecting base is adjacent to the first connecting base;
a first screen, slidably disposed in the first connecting base and the second connecting base and having a first display surface; and
a second screen, detachably disposed in the second connecting base and having a second display surface, wherein
the second connecting base is suitable for rotating relative to the hinge module to be aligned with the first connecting base, so that the first screen and the second screen are flush with each other, and the first display surface and the second display surface are located on a same plane.

22. The electronic device with multi screens according to claim 21, further comprising a plurality of positioning magnets, respectively disposed on two opposite sides of the first screen and the second screen, wherein the corresponding positioning magnets are magnetically attracted to each other.

* * * * *